United States Patent [19]

Johnson et al.

[11] 4,063,068
[45] Dec. 13, 1977

[54] FOOD HEATING AND COOKING RECEPTACLE

[75] Inventors: David G. Johnson, Maplewood; Robert D. Thorson, St. Paul, both of Minn.

[73] Assignee: Minnesota Mining and Manufacturing Company, St. Paul, Minn.

[21] Appl. No.: 713,907

[22] Filed: Aug. 12, 1976

[51] Int. Cl.² .............................................. F27D 11/02
[52] U.S. Cl. ................................... 219/441; 219/386; 219/430; 219/436; 219/439; 219/543
[58] Field of Search ............... 219/210, 385, 386, 387, 219/429, 430, 436, 438, 439, 440, 441, 521, 543, 549, 461, 464

[56] References Cited

U.S. PATENT DOCUMENTS

| 1,678,885 | 7/1928 | Thomas | 219/441 X |
| 1,946,220 | 2/1934 | Lotz | 219/440 |
| 2,611,070 | 9/1952 | Chandler | 219/441 |
| 2,939,807 | 7/1960 | Needham | 219/543 X |
| 2,955,185 | 10/1960 | Cox | 219/210 |
| 3,108,170 | 10/1963 | Murphy | 219/543 X |
| 3,191,004 | 6/1965 | Hocker | 219/461 |
| 3,231,718 | 1/1966 | Vasile | 219/465 |
| 3,385,952 | 5/1968 | Mix | 219/387 |
| 3,391,271 | 7/1968 | Campbell | 219/440 |
| 3,496,336 | 2/1970 | Hingorany et al. | 219/464 |
| 3,524,920 | 8/1970 | Stromquist et al. | 219/543 X |
| 3,573,430 | 4/1971 | Eisler | 219/385 |
| 3,725,645 | 4/1973 | Shevlin | 219/521 |
| 3,739,148 | 6/1973 | Ryckman | 219/441 |
| 3,757,087 | 9/1973 | Bernard | 219/549 |
| 3,869,596 | 3/1975 | Howie | 219/438 |
| 3,909,591 | 9/1975 | Ulam | 219/438 |
| 4,002,883 | 1/1977 | Hurko | 219/543 |

Primary Examiner—Volodymyr Y. Mayewsky
Attorney, Agent, or Firm—Cruzan Alexander; Donald M. Sell; Robert W. Burns

[57] ABSTRACT

A portable food serving receptacle capable of heating chilled or frozen food to cooking or serving temperatures and automatically maintaining food at serving temperature. The receptacle consists of thin metallic walls and utilizes a flexible heating element of electrical and thermal insulating material. The heating element is adhered to the metallic walls of an inner dish of the receptacle. The insulating material of the heating element forms a laminated structure in which the electrical resistor is embedded. The walls of the receptacle have a substantially higher thermal conductivity than the laminate. The rate of heat flow from the heating element to the interface of the food and metallic walls of the receptacle is controlled by the thermal insulating characteristics of the laminate so that gradients of heat entering any given point of the food are substantially equal and are maintained at temperature levels below the scorching temperature of the food.

1 Claim, 6 Drawing Figures

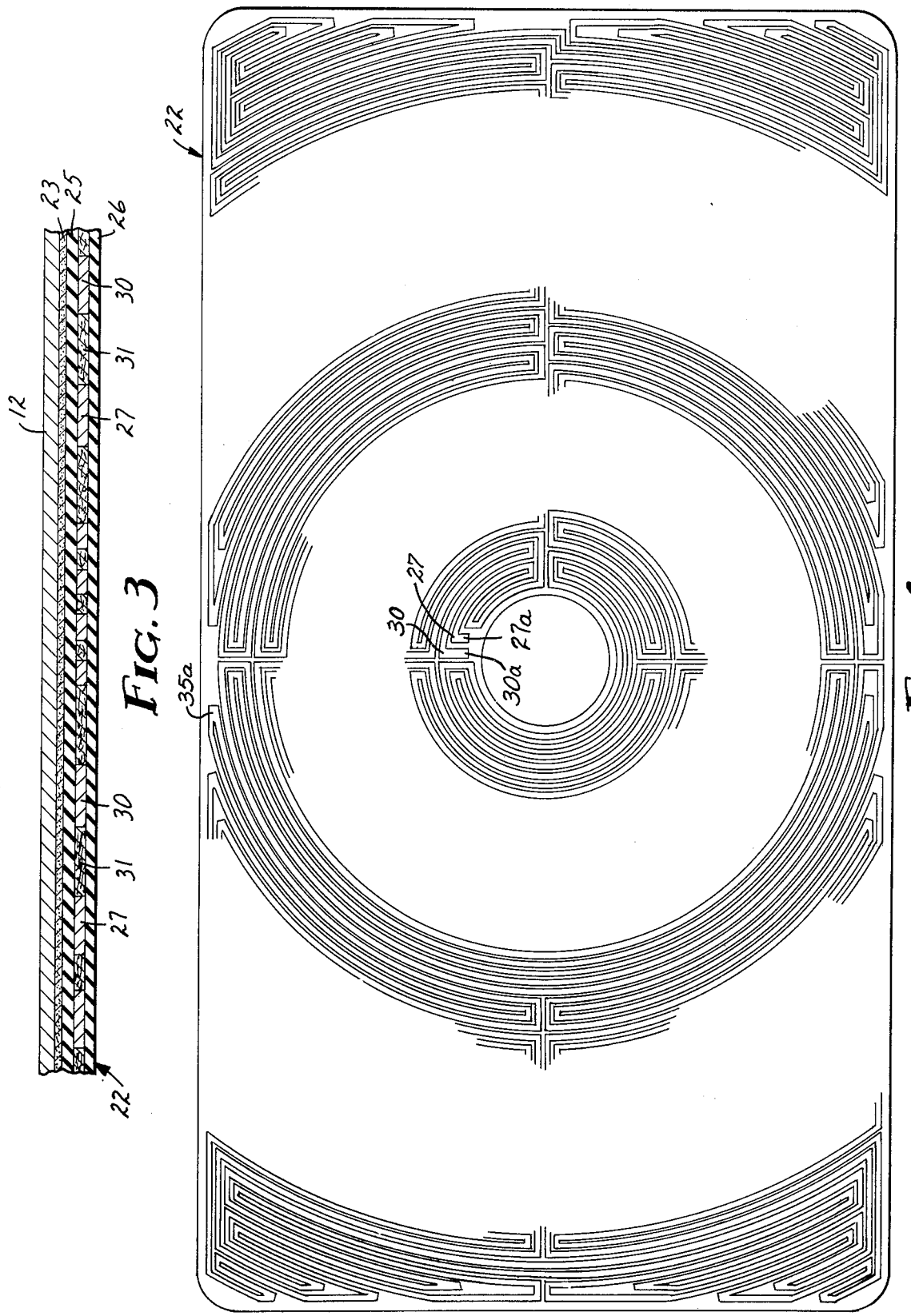

FOOD HEATING AND COOKING RECEPTACLE

BACKGROUND OF THE INVENTION

1. Field of the Invention

This invention relates to an improved cooking and heating receptacle for food in which the flow of heat from the resistor or electrical heating conductors to the food is controlled by a thin flexible polymeric heating element or laminate. The thermal charasteristics of the laminate controls the rate of heat transferred from the resistor into the food elminating hot spots along the path of the resistors (normally encountered in conventional heating elements) and thereby retaining the temperature levels of the food below its scorching temperature without the necessity of metallic or liquid heat diffusers, mixing the food during heating, etc.

2. Description of the Prior Art

Considerable prior art has been directed to various means for evenly distributing or transferring heat in cooking vessels from the heat source into the food. Many prior artisans have used metal as the means for diffusing the heat.

For example, U.S. Patent No. 2,603,740 issued July 15, 1952 to E. Del Buttero shows a thick walled heating pan with an integral resistor. The thick metal walls of the pan serve as the means for diffusing heat. However, thick metal walls are not sufficient to evenly distribute the heat. Food in heating pans of this nature needs constant attention such as mixing or stirring to prevent the food from scorching or burning. This is a basic problem with most all prior art devices as there is a lack of proper heat distribution at the interface of the pan and food.

U.S. Pat. No. 3,875,370 issued Apr. 1, 1975 to L. G. Williams, shows a bar or aluminum 11 encased in a resin jacket and disposed below the surface of the cooking dish for the purpose of serving as a heat distributor. A heating element 29 may be embedded in the aluminum distributor.

U.S. Pat. No. 3,010,006 issued Nov. 21, 1961 to F. C. Schwaneke, shows a metallic heating receptacle with a metal heat distributing member 28 interfaced directly with the heating pan or receptacle 10.

U.S. Pat. No. 3,798,415 issued Mar. 19, 1974 to E. M. Graham, discloses an aluminum diffuser 6 of varying thickness for the purpose of diffusing or distributing heat along the bottom of a thin walled pan. Other teachings such as that disclosed in U.S. Pat. No. 2,969,452 issued Jan. 24, 1961 to T. L. Geller et al use a liquid such as silicone oil which may be placed in a chamber 16 adjacent to or under the cooking receptacle per se. See particularly FIG. 3 of Geller.

Other artisans have directed their attention to embedding heating elements in laminated structures. For example, U.S. Pat. No. 2,804,533 issued Aug. 27, 1957 to M. Nathanson discloses a heating element embedded in a polymeric lamina. The heating element can be adapted to devices such as space heaters or heaters for heating solids or liquids. It contains a conducting wire 5 held to mat 2 which in turn is encased in insulating mats 3 and 4.

U.S. Pat. No. 2,938,990 issued May 31, 1960 to H. Levine, shows a calrod type of heating element 6 encased in insulating material which in turn is placed in a metallic sheath 8 brazed to the wall of the cooking receptacle.

U.S. Pat. No. 3,597,591 issued Aug. 3, 1971 to David L. Van Derlip shows an electrical conductor 14 of fiberglass and aluminum particles sandwiched or encased between Teflon insulation layers 12 and 13. See FIG. 4.

Another integral laminated heating element is disclosed in U.S. Pat.No. 3,909,591 issued Sept. 30, 1975 to John B. Ulam. This patent illustrates an arcuate heating element 40 laminated to the bottom of the heating receptacle.

U.S. Pat. No. 3,191,004 issued June 22, 1965 to J. P. Hocker also shows a laminated heating element. In this reference an RTV adhesive is vulcanized to the heating receptacle with the heating element per se laminated between silicone rubber sheets 28 and 30.

Other artisans have used thin polymeric heating elements in connection with cookware but have controlled the distribution of heat by utilizing heating elements with different power intensities. For example, see U.S. Pat. No. 3,869,596 issued Mar. 4, 1975 to John R. Howie wherein the heating element illustrated in FIG. 4 is divided into three general areas each with different power densities to provide for the requisite amount of heat to be transferred to different areas of the cooking vessel and the food therein.

A good deal of prior art has been directed to utilizing thermostats to control the outer parameters of heat to be generated and transferred from the heating receptacle into the food. An exemplary patent is U.S. Pat. No. 2,480,337 issued Aug. 30, 1949 to G. C. Pearce which shows a bimetallic thermostat 52 connected directly to the bottom of the receptacle which contains the food to be heated.

Additionally, thermostats have been used to control the initial generation of heat and once a predetermined level of heat is attained, retain such level by "hold-heating", i.e. by de-energizing a portion of the resistor. For example, U.S. Pat. No. 1,678,885 issued July 31, 1928 to I. G. Thomas shows a heating device with a series of heating elements 17-21. All of the elements are energized to initially heat the material to predetermined levels and then thermostat 24 is opened to cut out part of the resistors leaving resistors 18 and 19 energized for continuous or "hold-heating" at a lower level.

U.S. Pat. No. 3,725,645 issued Apr. 3, 1973 to Thomas S. Shevlin, shows a cooking dish similar to that disclosed in the instant invention. However, Shevlin teaches the introduction of heat in pulses so that the heat (ranging from 211 to 223 B.T.U. in 10-20 minutes) introduced into the food is absorbed during intermittent periods when energy is not applied to the heating element. For this reason the surface of the low heat capacity dish supporting the food does not transfer heat to the food at temperature levels that would scorch the food.

SUMMARY OF THE INVENTION

The present invention discloses the use of thin flexible heating elements which are adhered to the metal food supporting dish of a light weight double walled metallic food receptacle. The heating element is designed so that it may be connected directly to a 110 volt source of electric energy. The upper and lower limits of heat generated by the element and transferred to the metal dish and food are controlled by thermostats. The receptacles may be manufactured large enough to cook food in bulk quantities. Their light weight makes them easy to transport. The double wall construction provides simplified handling in a safe manner even when the food is hot. As a result of their mobility and independence of auxiliary power equipment the receptacles have many uses. For example, food may be precooked or prepared in a centralized kitchen and then placed in the receptacles in either chilled or frozen state and distributed to satellite feeding areas such as school systems, churches, factory complex food facilities or any other congregate feeding program, e.g. catering services, etc. Once the receptacles arrive at the eating area, they are connected to suitable power source to reconstitute the food for serving. If desired, fresh or frozen food may be placed in the receptacle and cooked at the food serving site. Once the food has been cooked or precooked food heated to desired serving temperatures, a thermostat automatically cuts off part of the power supply and the unit continues to supply heat at a lower power rate for hold-heating or maintaining the food at serving temperatures.

Thus, the use of a thin flexible heating element that is easily adhered to a metal surface combined with a double walled metallic food receptacle that is relatively easy to manufacture results in an inexpensive light weight food handling device which has a number of advantages over prior art food heating or cooking devices.

The heating element per se consists of electrical conductors embedded in a laminate of polymeric material. The thermal characteristics of the laminate per se provides an even heat distribution eliminating the need of a thick iron receptacle, constantly attending the food by stirring, etc. or large metallic or liquid heat diffusing equipment. The thermal conductivity of the laminate is matched with the heat to be generated by the electrical conductors so that the laminate per se serves as a thermal insulator to control the rate of heat flowing from the conductors through the laminate to the receptacle and food. As heat is transferred from the laminate into the thin metal receptacle, which has a relatively high heat conductivity, the heat rapidly passes through the receptacle into the food. The quantity of heat passed through the laminate and metallic receptacle into the food at any given point of the interface of the food and receptacle is substantially equal. Furthermore, this quantity of heat transferred into the food is correlated to the foods thermal conductivity, that is, its ability to absorb heat. As a result, there are no hot spots generated along the path of the resistor and the temperature levels of heat introduced to the food is below its scorching temperature but above temperature levels conducive to growth of pathogenic bacteria. It is thus not necessary to add bulky devices to diffuse heat, complex devices to introduce power in intermittent stages or manually mix the food to prevent it from scorching. All one needs to do is connect the heating element to a conventional power source and allow the unit to heat the food and maintain it at desired temperature levels.

DESCRIPTION OF THE DRAWINGS

The present invention will be more fully understood after reading the following detailed description which refers to the accompanying drawings where like numerals refer to like parts throughout the several views and wherein:

FIG. 3 is an enlarged cross-sectional view of the heating element and the dish bottom taken along the lines 3—3 of FIG. 2;

FIG. 4 is a top view of the heating element with the adhesive and upper part of the silicone rubber layer broken away to illustrate the path of the electrical conductors, the path of the electrical conductors shown only in part for the purpose of clarity;

Referring to FIG. 1, the food heating and cooking receptacle generally designated 10 consists of a base member 11 and dish member 12. Dish member 12 is welded to a lip 13 of the base 11 at weld 14 and is therefore suspended in spaced relation within base 11 forming spaces 16 and 17 at the end of the dish and void 15 between the bottom of the dish and the bottom of base 11. Spaces 16 and 17 and void 15 are preferably lined along base 11 with insulating material 20 such as 1/2 inch (1.25 cm) thick glass wool batting.

Figure 1:
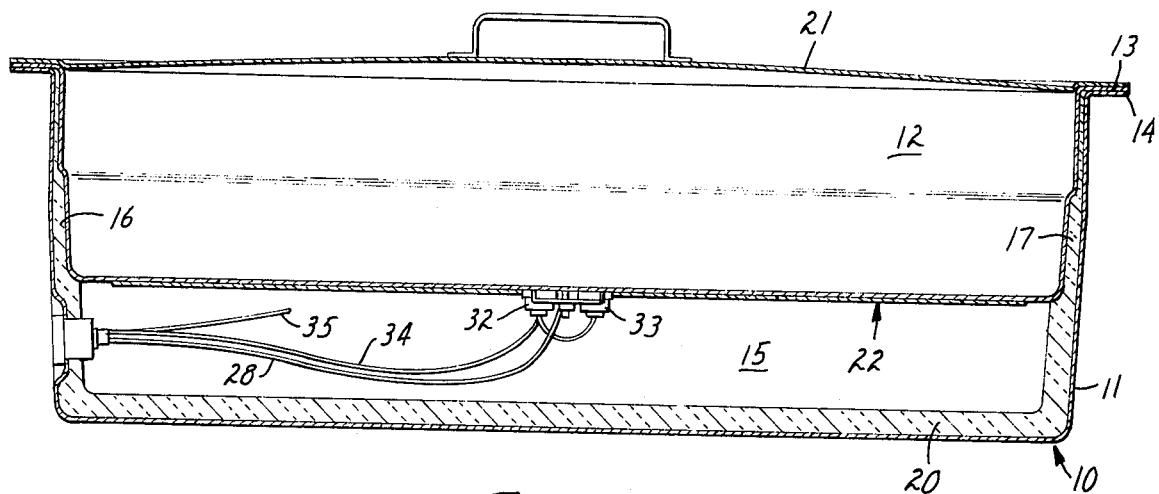
FIG. 1 is a cross-sectional view of the food heating receptacle showing a metallic food supporting dish with the heating element secured thereto and suspended in a base.

In essence the device is a double walled receptacle which provides several salient features. One such feature is that the heated bottom of dish 12 is never placed on a supporting surface thus eliminating the possibility of scorching or burning counter tops, etc. A further safety feature resides in the fact that the space between dish 12 and base 11 forms a thermally insulating barrier so that base 11 never attains unsafe temperature conditions. Still further the enclosed spaces including void 15 between the dish 12 and base 11 from a thermally encapsulated chamber so that substantially all of the heat energy generated by the heating element passes through dish 12 into the food.

It is preferred that both the dish 12 and base 11 be made of 20 gauge stainless steel of 0.0355 inches (0.09 cm) thickness and having a weight of 1.46 pounds per square foot (7.12 kg/sq meter) and a thermal conductivity of 0.162 watts/(cm$^2$) (°C/cm). A dish 12 made within these parameters has a low heat capacity so that substantially all heat generated by the heating element is passed rapidly through the dish 12 into the heat sink or food. A cover member 21 may be suitably secured to the top of the base 11 to cover the receptacle when food is not being served from it. The cover helps to act as a thermal barrier so that food can be stored for some time in the receptacle before it is heated. For example, food with low initial temperature may be placed in the receptacle and maintained therein for safe storage periods up to several hours. Thus, it is not necessary to provide refrigeration if the food is to be kept a short period of time prior to being heated.

An important feature of the invention is the flexible heating element generally designated 22. It is essentially a laminated structure which is adhered to the under surface of the bottom portion of dish 12 as best seen in FIGS. 1 and 3. Referring to FIG. 3, element 22 consists of an adhesive coating 23 which forms the agent or means with which the entire element 22 may be vulcanized or otherwise suitably adhered onto the bottom portion of dish 12. The exposed upper and lower lamina of element 22 consists of a silicone rubber material that provide the heating element 22 with flexible characteristics. The flexibility feature allows the element to be vulcanized onto receptacles of various configurations and also compensates for the expansion and contraction of the stainless steel dish 12 during heating.

The laminations which form the laminated heating element 22 consists of an upper silicone rubber lamina 25 and a lower silicone rubber lamina 26. The resistor or electrical conductors are formed by metallic ribbons 27 and 30 which form two discrete conductors each in concentric pattern or configuration. Each of the conductors 27 and 30 are adhered to the inner surface of the silicone laminations. A fiberglass cloth 31 is intermeshed with conductors 27 and 30 between the silicone rubber laminas 25 and 26.

The essential purpose of the laminate along with adhesive coating 23 is to control the rate and spacial distribution, i.e. diffusion, of heat flow and to permit rapid thermal response to the total heat flow to dish 12 when varying the energy to conductors 27 and 30.

The thickness of the laminate is important. Its thickness together with the amount of bonding adhesive permits a steady state, i.e. continuous rate of energy input, to the interface of dish 12 and the food. If the laminate adhesive layer is too thin it allows hot spots to occur at the interface of the heating element 22 and the dish. 12. If the laminate adhesive layer is too thick, it reduces the units efficiency to heat and reconstitute the food in dish 12 and may also cause overheating due to the fact that a thick layer will act as a heat sink and cause a time lag effect. The thickness of the heating element 22 should be designed so that the rate of energy input is at least 0.35 watts/cm$^2$ for both conductors 27 and 30 and no more than 0.6 watts/cm$^2$. The preferred energy input is 0.4 to 0.5 watts/cm$^2$ for the conductors while the preferred thickness of the laminate is about 0.75 mm. During the hold-heating period described below when only a single conductor is energized, one-half of the energy values are preferred.

The thermal characteristics and thickness of the laminated heating element and adhesive layer is such that the diffusion of the thermal energy provides an essentially uniform rate controlled watts/cm$^2$ density at the interface of the food and dish 12. With the dish 12 and heating element 22 designed as described above, the only heat sink is the pan contents, i.e. the food. The laminate is thus the heat rate control means or "valve" to permit migration of heat into the food at a heat rate matched with the food's thermal diffusivity, i.e. the ability of the food to absorb the uniform and continuous flow of heat energy.

The silicone rubber and fiberglass laminations thus serve as thermal insulators or heat distributors in that these parts of the structure distribute the heat generated by the conductors substantially uniformly into the dish 12 and any food supported thereon. As heat is transferred or migrates from element 22 to dish 12 it quickly passes through dish 12 which has rapid thermal response characteristics as compared to the laminate and reaches the food in substantially equal gradients of heat at any given point along the interface of the food and dish.

If desired, the heating element 22 after being adhered to dish 12 may be covered by insulating material such as fiberglass insulating batting.

A suitable heating element of this kind and within the parameters described below can be obtained from Minco Products Inc. and is sold by that company under the trademark or tradename "Thermofoil".

It can be readily seen that if heat generated by conductors 27 and 30 is maintained within certain parameters, there will be a substantially even flow or migration of heat to the food at temperature levels below the scorching temperature of the food and hot spots along the surface of dish 12 corresponding to the location of the conductors will be eliminated.

Some exemplary parameters for a satisfactory heating element 22 described above and that may be utilized with this invention can best be explained by referring to FIG. 4. Conductors 27 and 30 are preferably formed in a concentric configuration between the silicone rubber laminations 25 and 26 and intermeshed with the fiberglass cloth 31. Cupro nickle serves as an excellent material for the conductors and the conductors were designed with an overall average energy output of 2.8 watts per square inch (0.43 watts/ cm$^2$). The overall size of the heating element 22 used in this invention was approximately 9 ½ × 17 inches (24 × 43 cm) and the wattage capacity for each conductor 27 and 30 was 225 watts.

The entire heating element 22 consisting of the laminate and conductors described above has a relative thermal conductivity of less than 0.1 while the stainless steel dish 12 has a thermal conductivity of 1100 times that of element 22. The preferable thermal conductivity of the element 22 is equivalent to about $1.44 \times 10^{-4}$ watts/(cm$^2$) (°C/cm).

When element 22 is produced within these parameters, the laminate serves as a thermally insulating media to control and regulate the heat transfer rate from the conductors 27 and 30 to the interface of the food and dish 12.

Figure 2:
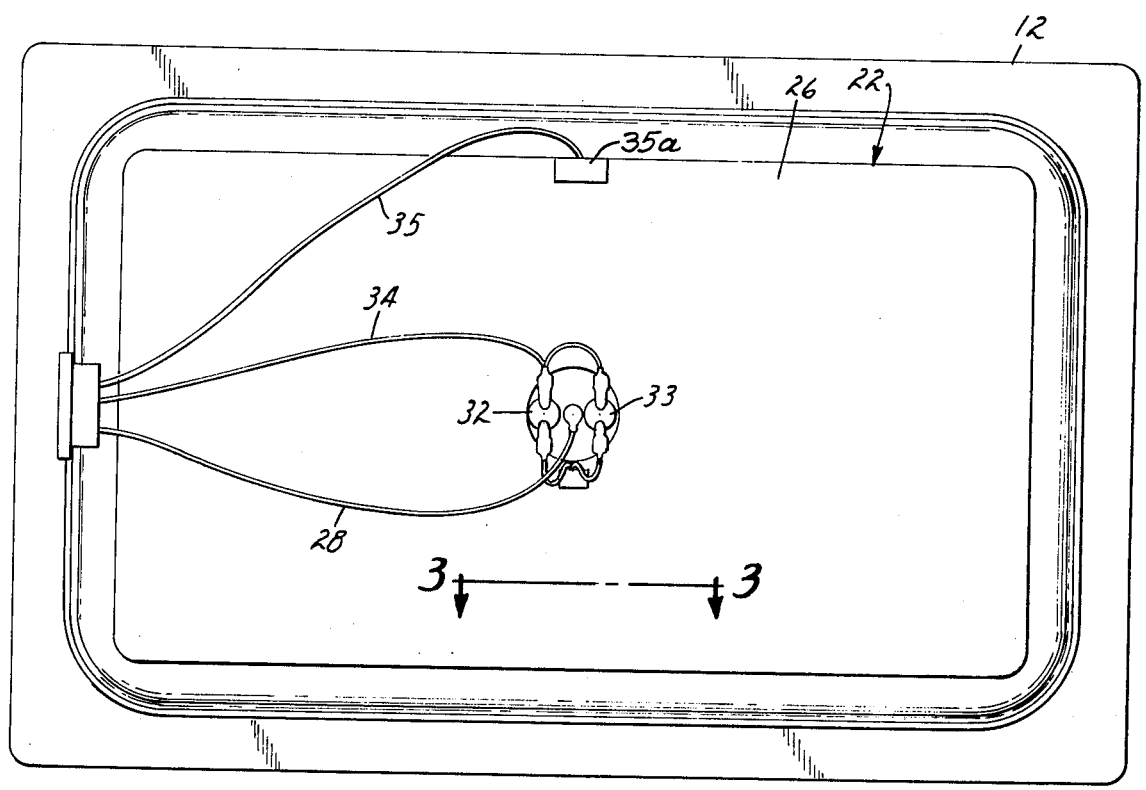
FIG. 2 is a bottom view of the dish and heating element showing thermostats and electrical leads connected to the heating element and a ground connected to the dish.
Figure 5:
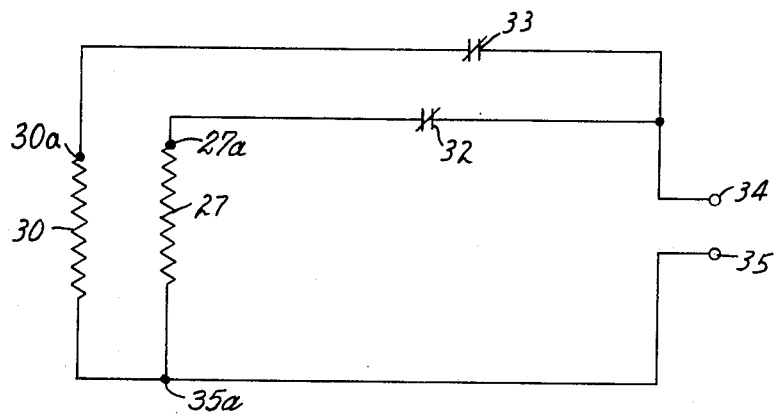
FIG. 5 is a wiring diagram of the circuit used to energize the conductors.

Referring now to FIGS. 4 and 5, it is seen that each of the conductors is controlled by a thermostat. It was found that the "snap on" type of bimetallic thermostats worked satisfactorily as they could be disposed in a hole at the center of element 22 and fastened to the bottom surface of dish 12 as seen in FIGS. 1 and 2. The thermostats sense the heat conducted along the lower or bottom surface of dish 12.

Conductor 27 is controlled by thermostat 32 and conductor 30 is controlled by thermostat 33. Each thermostat is interconnected to the energizing circuit of the receptacle as shown in FIG. 5. The circuit may be connected to a 110 volt electrical source by leads 34 and 35. As seen in FIGS. 4 and 5 the two conductors 27 and 30 are interconnected in parallel circuits from lead 34 via contact points 27a and 30a. Lead 34 interconnects the conductors 27 and 30 to the electrical source via thermostats 32 and 33 as shown in FIGS. 2 and 5. The conductors have a common terminal point indicated at 35a which is connected to the lead 35 (see FIGS. 2, 4 and 5). If desired, the circuit may be grounded to dish 12 by a ground wire 28 connected directly to dish 12 as shown in FIG. 2.

Thermostat 32 is designed to sense temperature ranges between 190°–217° F (81°–103° C) while thermostat 33 is designed to sense temperatures within the range of 170° to 206° F (72°–97° C). When initially heating or when cooking food both thermostats are closed and thus both conductors 27 and 30 are energized with the full load of electrical power for heating or cooking food. Once the temperature level of dish 12 reaches 206° F (97° C), thermostat 33 cuts off the electrical supply to conductor 30 thus leaving conductor 27 as the sole means for supplying heat. Once conductor 30 is de-energized, approximately one-half of the full load or 225 watts of electrical power produces a sufficient amount of heat to maintain the food at serving temperatures throughout the time the food is served, i.e. the hold-heating period. In event the food should reach a temperature conducive to further cooking or is completely removed from dish 12, thermostat 32 will cut off all power to the heating element when the surface of dish 12 reaches 217° F (103° C) preventing damage to the unit and overheating of dish 12 and thus heat degredation of food subsequently placed in the dish.

In event the temperature in the dish drops below 190° F (88° C) thermostat 33 will close to again introduce one-half the full electrical load. In event cold food is introduced into dish 12, the temperature will obviously drop below 170° F (77° C) and in such situation both thermostats 32 and 33 will close applying a full load of electrical power to element 22 to automatically return dish 12 and its contents to serving temperatures.

Inasmuch as a greater heat loss is experienced at the outer edges of dish 12, the conductors 27 and 30 can be designed to compensate for such loss by well known means such as increasing the resistance capacity of the conductors along the outer edges of the dish. For example in the instant invention, it was found that heat loss along the outer edges of dish 12 could be compensated by increasing the resistance of each conductor 27 and 30 along the outer edges of the dish to approximately 1.48 watts per square inch (0.23 watts/cm$^2$) as compared with an overall average of 1.39 watts per square inch (0.21 watts/cm$^2$) for each of the conductors 27 and 30 along the surface of dish 12 closer to its center.

Figure 6:
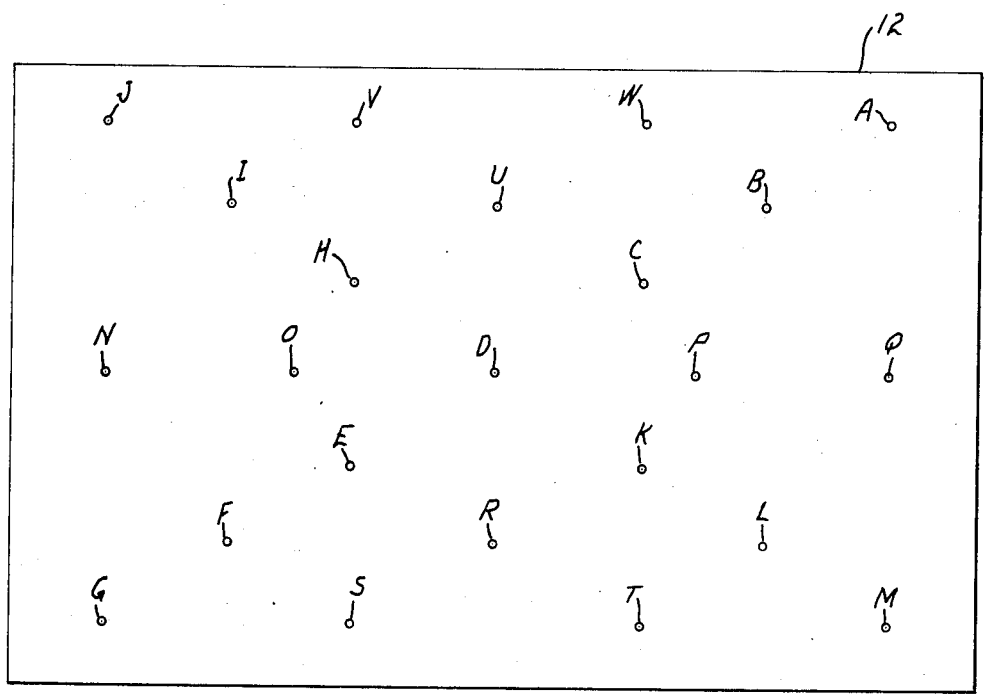
FIG. 6 is a top view of the upper surface of the dish showing distribution of thermocouples used in determining a temperature profile at various points on the dish surface during cooking of food.

The even heat distribution characteristics of the receptacle that result in substantially equal gradients of heat being introduced into the food can best be understood by viewing FIG. 6 and the table set out below. A profile of temperature levels at the interface of the food and dish 12 was conducted to illustrate that even gradients of heat enter the food at any given point between the interface of the food and dish. In essence there is less than a 10% temperature variation between any given point along the dish and food interface. In determining the profile, thermocouples were placed along the surface of a dish 12 constructed within the parameter described above. The thermocouples were placed on the surface of dish 12 which interface with the food and disposed at positions designated A-W in FIG. 6. Goulash which is a viscous food was introduced in the dish at a temperature of 38° F (3.1° C) and full power of 450 watts was applied for 30 minutes. The gradients of temperature levels of heat which entered into the food at the various points where the thermocouples of FIG. 5 were located and the watt density at these points are shown in Table I.

TABLE I

| Thermocouple Designation | Temperature in | | Watt Density (For Single Conductor) | |
|---|---|---|---|---|
| | °F | °C | w/in$^2$ | w/cm$^2$ |
| A | 222° | 105.5 | 1.48 | 0.229 |
| B | 224° | 106.6 | 1.42 | 0.220 |
| C | 224° | 106.6 | 1.36 | 0.210 |
| D | 222° | 105.5 | 1.00 | 0.156 |
| E | 222° | 105.5 | 1.36 | 0.220 |

TABLE I-continued

| Thermocouple Designation | Temperature in | | Watt Density (For Single Conductor) | |
|---|---|---|---|---|
| | °F | °C | w/in$^2$ | w/cm$^2$ |
| F | 214° | 101 | 1.42 | 0.229 |
| G | 214° | 101 | 1.48 | 0.210 |
| H | 219° | 103.9 | 1.36 | 0.220 |
| I | 219° | 103.9 | 1.42 | 0.229 |
| J | 217° | 102.8 | 1.48 | 0.210 |
| K | 220° | 104.4 | 1.36 | 0.220 |
| L | 224° | 106.6 | 1.42 | 0.229 |
| M | 211° | 99.4 | 1.48 | 0.220 |
| N | 196° | 91.1 | 1.48 | 0.210 |
| O | 222° | 105.5 | 1.39 | 0.210 |
| P | 208° | 97.7 | 1.39 | 0.210 |
| Q | 218° | 103.3 | 1.48 | 0.217 |
| R | 221° | 105 | 1.28 | 0.217 |
| S | 215° | 101.7 | 1.36 | 0.217 |
| T | 215° | 101.7 | 1.36 | 0.217 |
| U | 217° | 102.8 | 1.28 | 0.210 |
| V | 218° | 103.3 | 1.36 | 0.210 |
| W | 220° | 104.4 | 1.36 | — |

As can be seen in Table I, the gradients of heat trasnferred to the food from the upper surface of dish 12 are substantially equal. The variations between the highest to lowest temperature levels differ by only 28° F (15.50° C). This is essentially less than a 10% variation in temperature levels and watt densities. Thus, at any given point at the interface between the food and dish 12, heat is transferred from the dish to food in substantially equal gradients.

Having thus described the present invention with respect to a preferred embodiment, it will be appreciated that changes may be made therein without departing from the spirit or scope of this invention.

We claim:
1. A food heating receptacle for heating food comprising:
   a. a base member;
   b. a metallic dish having a thickness of about 0.09 cm suspended in said base member and sealed at its outer edges with said base member, the bottom edge of the dish being in spaced relation to the bottom of said base member;
   c. a heating element secured to the bottom of said dish, the element consisting of a laminate of polymeric material and first and second electrical conductors interwoven in said laminate to form electrical conductors spaced from each other within said laminate to provide electrical insulation, the laminate forming thermal insulation means to control the rate of heat flow generated by said conductors through said laminate and dish to the interface of the dish and food so that the amount of heat transferred to the food at any point along the interface of the food and dish maintain said food in the range of 91.1° C and 106.6° C;
   d. a first thermostat connected to said first conductor and disposed on said dish to energize and de-energize said first conductor within predetermined temperature levels for heating and cooking food;
   e. a second thermostat connected to a second conductor and disposed on said dish to energize and de-energize said second conductor within predetermined temperature levels for maintaining the food at serving temperatures and for de-energizing said conductors in event said temperature levels exceed predetermined temperature levels for the operation of said receptacle; and
   f. a thermal cover disposed over said dish and base member.

* * * * *

UNITED STATES PATENT AND TRADEMARK OFFICE
CERTIFICATE OF CORRECTION

PATENT NO. : 4,063,068
DATED : December 13, 1977
INVENTOR(S) : David G. Johnson and Robert D. Thorson It is certified that error appears in the above-identified patent and that said Letters Patent are hereby corrected as shown below:

In the Specification:

Page 2, line 16 (Col. 1, line 37), "or" should read --of--.

Page 9, line 1 (Col. 4, line 38), "from" should read -- forms --.

Signed and Sealed this

Sixth Day of March 1979

[SEAL]

Attest:

RUTH C. MASON
Attesting Officer

DONALD W. BANNER
Commissioner of Patents and Trademarks